United States Patent [19]
Lapeyre

[11] Patent Number: 4,832,187
[45] Date of Patent: May 23, 1989

[54] MODULAR CENTER DRIVE CONVEYOR BELT

[75] Inventor: James M. Lapeyre, New Orleans, La.

[73] Assignee: The Laitram Corporation, New Orleans, La.

[21] Appl. No.: 179,523

[22] Filed: Aug. 19, 1980

[51] Int. Cl.⁴ .................... B65G 17/06; B65G 23/06
[52] U.S. Cl. .................................. 198/851; 198/834; 198/853; 474/235; 474/224; 474/212
[58] Field of Search ..................... 198/853, 851, 834; 474/156, 157, 206, 207, 212, 224, 228, 235

[56] References Cited

U.S. PATENT DOCUMENTS

| | | | |
|---|---|---|---|
| 2,000,499 | 5/1935 | Roland | 474/157 X |
| 2,391,485 | 12/1945 | Simmons | 474/224 X |
| 3,066,549 | 12/1962 | Benjamin | 198/853 X |
| 3,870,141 | 3/1975 | Lapeyre et al. | 198/853 |
| 4,051,949 | 10/1977 | Lapeyre | 198/853 |
| 4,159,763 | 7/1979 | Kewley et al. | 198/853 |
| 4,213,527 | 7/1980 | Lapeyre et al. | 198/853 |
| 4,556,142 | 12/1985 | Lapeyre | 198/853 X |

FOREIGN PATENT DOCUMENTS 207460 1/1987 European Pat. Off. ............ 198/857

Primary Examiner—Joseph F. Peters, Jr.
Assistant Examiner—James M. Kannofsky
Attorney, Agent, or Firm—Weingarten, Schurgin, Gagnebin & Hayes

[57] ABSTRACT

A conveyor belt composed of a plurality of interconnected modules, each of identical construction and end to end mateable. Each module includes a multiplicity of elongated parallel spaced link elements terminating in first and second link ends. An intermediate section between the link ends is of grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. These intermediate sprocket recesses provide the benefit of minimizing chordal action and scrubbing between the mating surfaces of the module and sprocket.

12 Claims, 4 Drawing Sheets

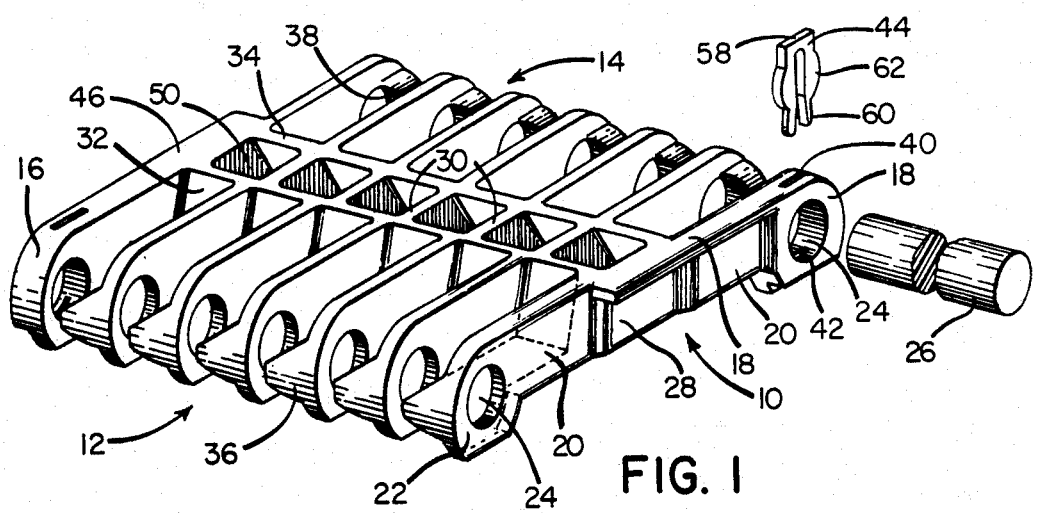
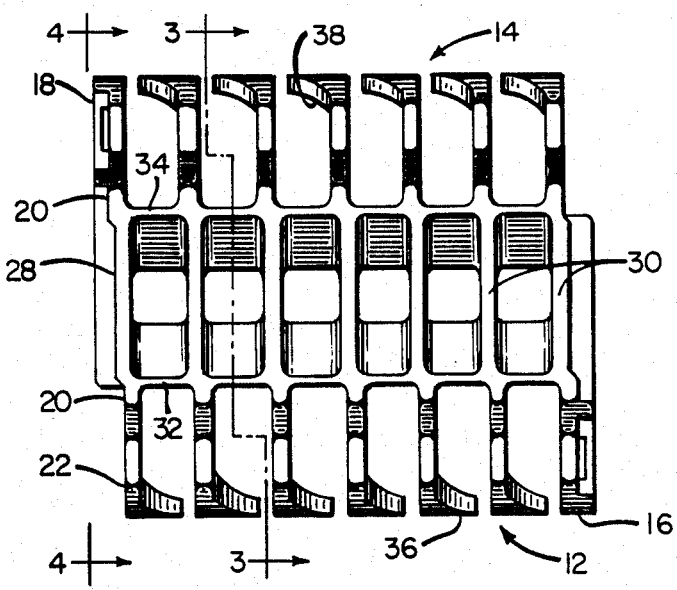
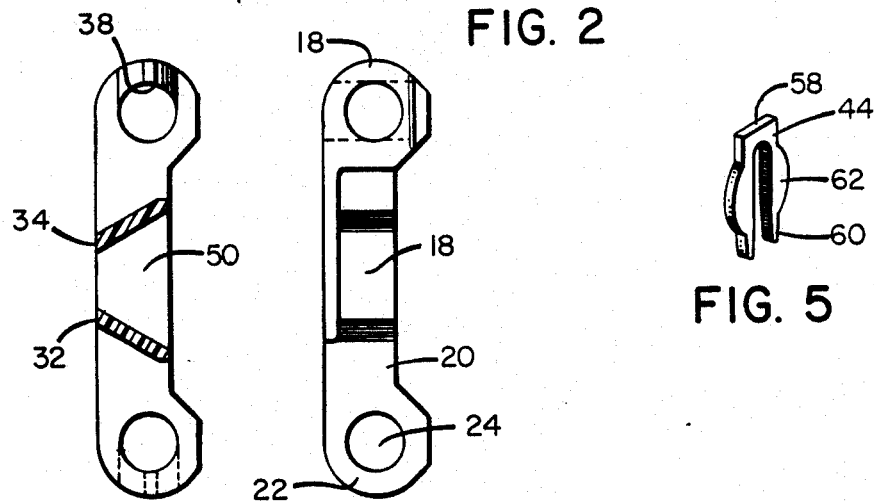
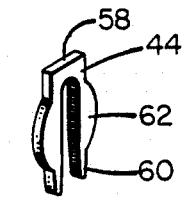

MODULAR CENTER DRIVE CONVEYOR BELT

FIELD OF THE INVENTION

This invention relates to conveyors and more particularly to a modular conveyor belt composed of interconnected like modules.

BACKGROUND OF THE INVENTION

A module conveyor belt is the subject of U.S. Pat. No. 3,870,141 and which comprises modules pivotally connected to one another, each module being molded as a single unit, preferably of a plastic material. Each module includes a number of parallel spaced links having end sections with aligned holes for accommodation of pivot rods, and intermediate sections joined by integral cross members to form a rigid supporting grid. The modules are end to end mateable; that is, a module is capable of being connected to or mate with a like module at its ends irrespective of which end of which module is employed. The conveyor module thus formed is simple and inexpensive to manufacture and assemble into a conveyor belt or the like of any width and length.

In U.S. Pat. No. 4,051,949 there is shown a variant of the above-described conveyor belt and which is operative to transport articles to and from a conveyor comb. This conveyor comprises modules similar to those shown in U.S. Pat. No. 3,870,141 and includes on each module a plurality of links or ribs which are upwardly extending to provide an upper surface above the surface of the cross members to provide axial passageways into which the teeth of the conveyor comb can extend while the belt is in motion.

In copending application Ser. No. 013,165, filed Feb. 25, 1979, abandoned Jan. 31, 1981, entitled Link Chain Belt, there is shown a link structure in which a driving tooth protrudes from the link at a position intermediate the pivot axes at the link ends. The location of the driving tooth midway between the pivot axes and the configuration of the driving tooth surfaces, when employed in conjunction with an associated sprocket wheel configuration, exhibits substantially low scrubbing action and small chordal action. Scrubbing action is known in relation to chain belts wherein the link teeth and sprocket teeth engage one another with a scrubbing or rubbing contact. Chordal action in chain drives is also known and comprises a vibratory motion of the chain as it engages the sprocket wheel.

SUMMARY OF THE INVENTION

In brief, the present invention provides a conveyor belt which is similar to and an improvement over the aforesaid structures. The novel belt is composed of a plurality of interconnected modules, each of identical construction and which are symmetrical such that any linking end of a module can be connected to any linking end of an adjacent module. Each module includes a multiplicity of elongated parallel spaced link elements terminating in first and second link ends. An intermediate section between the link ends is of grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. These intermediate sprocket recesses provide the benefit of minimizing chordal action and scrubbing between the mating surfaces of the module and sprocket. Aligned openings are provided in the link ends for accommodation of pivot rods by which modules are linked together. Retaining pins are inserted in the module ends for retention of the pivot rods.

DESCRIPTION OF THE DRAWINGS

The invention will be more fully understood from the following detailed description taken in conjunction with the accompanying drawings, in which:

FIG. 1 is a perspective view of a conveyor module embodying the invention;

FIG. 2 is a bottom view of the module of FIG. 1;

FIG. 3 is a sectional view taken along lines 3—3 of FIG. 2;

FIG. 4 is a sectional view taken along lines 4—4 of FIG. 2;

FIG. 5 is a perspective view of a retaining pin useful in the invention;

DETAILED DESCRIPTION OF THE INVENTION

Figure 6:
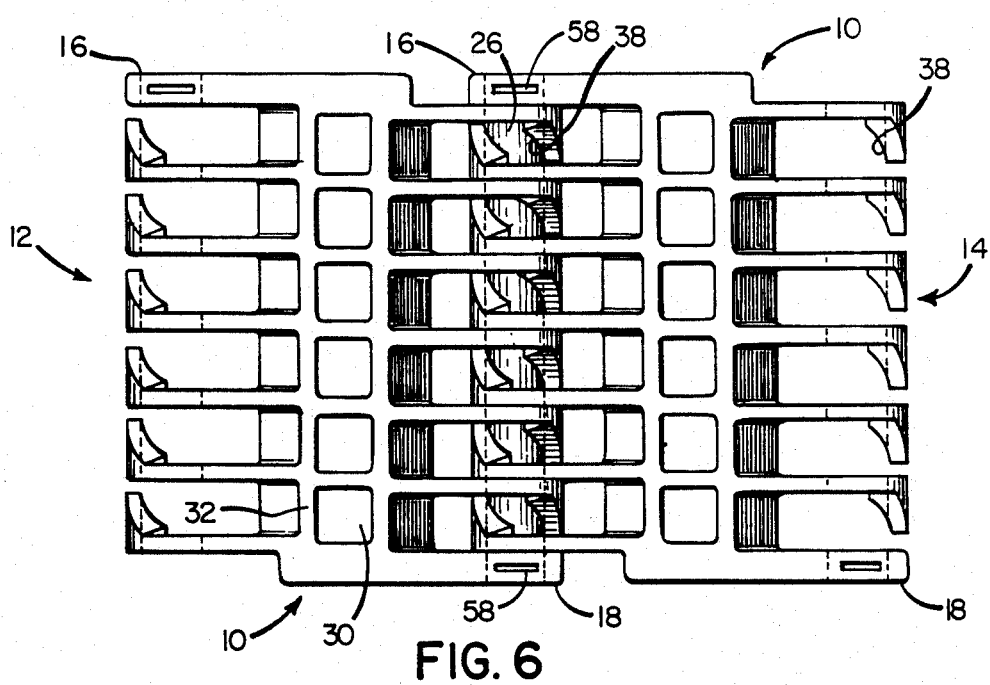
FIG. 6 is a top view of a pair of interconnected modules.

Referring to the drawing and particularly FIGS. 1-4, there is shown a module 10 which is interconnected with like modules to produce a modular conveyor belt in accordance with the invention. Each module 10 is formed as an integral unitary structure of plastic material by well-known injection molding or other molding processes. Each module 10 includes a multiplicity of elongated parallel spaced link elements, the length of the module being equal to the length of the link elements, and the width of the module being determined by the number of link elements. The module includes a first plurality of link ends 12 and a second plurality of link ends 14, each of which is identical in construction except for diagonally opposite outer link ends 16 and 18. Each link end 12 and 14 includes a section 20 terminating in an end section 22 which encircles an opening 24. The openings 24 of the respective link ends are aligned along a common axis and accommodate a pivot rod 26 inserted therethrough. The link ends 12 and 14 are joined by an intermediate section 28 which is of grid-like structure composed of longitudinal sections 30 and transverse sections 32 and 34. The intermediate sections 30 are parallel to and laterally offset from the link ends. The intermediate sections 32 and 34 are angled toward the respective link ends.

Triangular projections 36 are provided on each link end, except for ends 16 and 18, and extend transversely of the link, terminating short of the confronting link end by an amount to accommodate the link end of a mated link module. These projections serve as spacers to maintain interconnected modules in intended linked position as seen in FIG. 6. The inner surface 38 of projections 36 are cylindrically contoured to mate with the cylindrical surface of a pivot rod 26. These projections provide sufficient bearing surface area to accommodate the tensile forces of the interconnected modules being driven along a conveyor path, while providing exposure of significant portions of the pivot rod for ease of visual inspection and cleaning. The exposed pivot rod is also more responsive to temperature changes and tends to expand and contract by the same amount as the link structure. The skewed edges of the projections 36 also serve as wipers to push debris which may collect on the pivot rod away from the bearing area.

The diagonally opposite outer link ends 16 and 18 are thicker than the other end sections 22 and each includes slots 40 and 42 for accommodation of a retaining pin 44 which retains the pivot rod 26 within the aligned openings 24 of the mated modules. The outer link ends 16 and 18 are joined to respective side rails 46 and 48 which serve as rub rails to minimize damage to the sides or side edges of the module.

Figure 7:
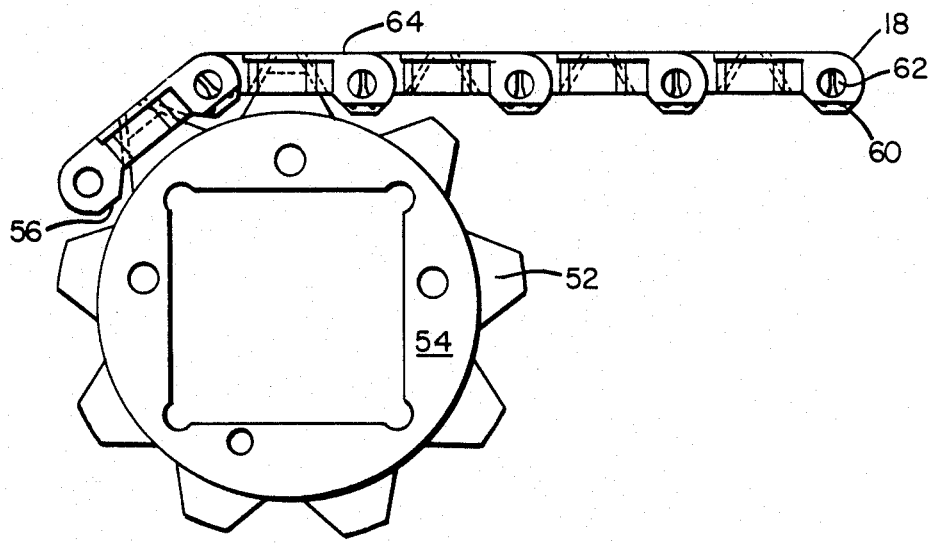
FIG. 7 is an elevation view of a modular conveyor belt embodying the invention and cooperative with a sprocket wheel.
Figure 8:
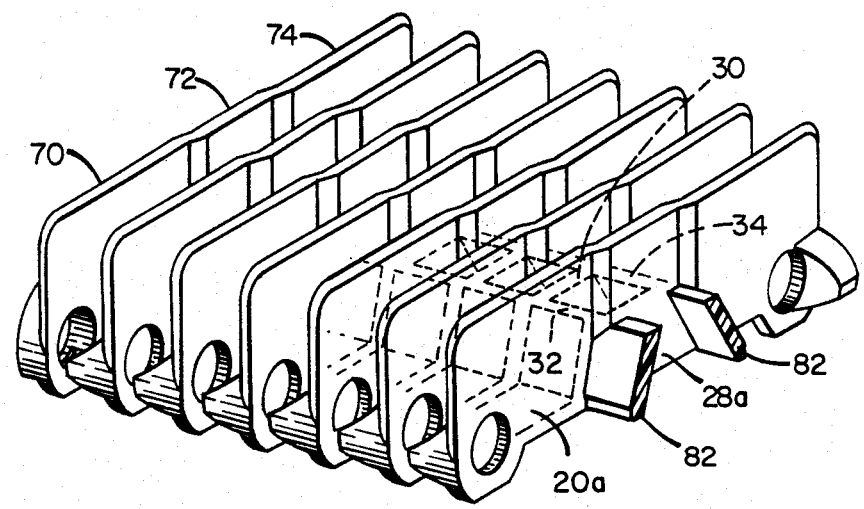
FIG. 8 is a perspective view of an alternative embodiment of the module of FIG. 1.
Figure 10:
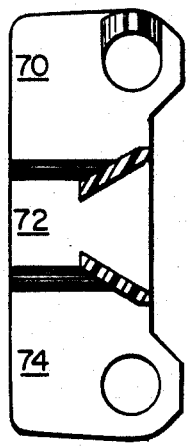
FIG. 10 is a sectional view taken along lines 10—10 of FIG. 9.
Figure 11:
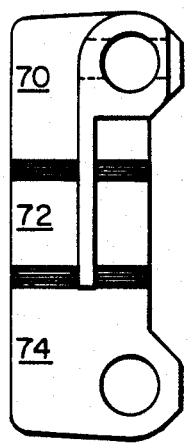
FIG. 11 is a sectional view taken along lines 11—11 of FIG. 9.
Figure 9:
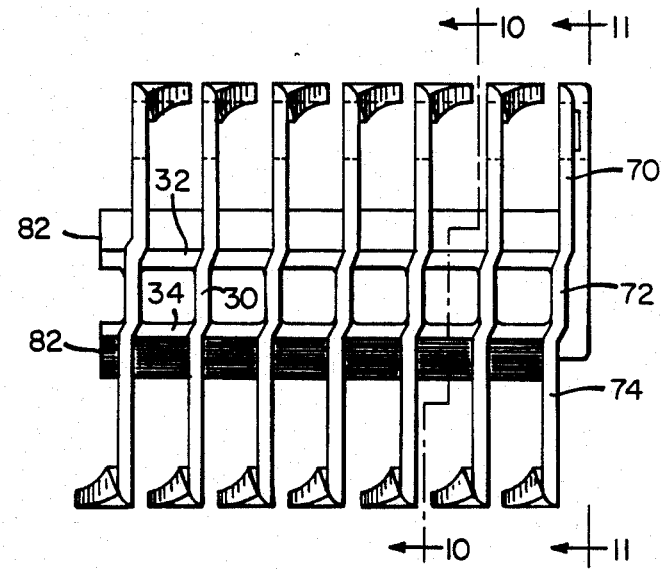
FIG. 9 is a top view of the module of FIG. 8.

The intermediate section 28 of the module composed of sections 30, 32, and 34, serves as a box beam across the width of the module which provides a structurally strong and lightweight module which is resistant to bending and which maintains its structural integrity under operating forces. The recesses 50 provided by the sections 30, 32, and 34 are operative as sprocket recesses located midway between the pivot axes of the module and which are adapted to mate with corresponding sprocket teeth 52 of an associated sprocket wheel 54, as shown in FIG. 7. The sprocket teeth 52 of the sprocket wheel include parallel side surfaces and inclined front and back surfaces configured to engage the corresponding surfaces of sprocket recesses 50. In the illustration of FIG. 7, the sprocket wheel 54 is adapted to be secured on a square shaft. A plurality of sprocket wheels is employed across the width of the module to provide intended support and driving force. The end sections of the module include flatted portions 56 to provide clearance between the linked modules and the sprocket wheel.

The sprocket recesses 50 can be considered as the inverse of the center sprocket teeth shown in copending application Ser. No. 013,165 (LAIT-58), abandoned Jan. 31, 1981, and provide the same benefits of minimizing chordal action and scrubbing between the mating surfaces of the module and sprocket wheel. The placement of the sprocket recesses midway between the pivot axes, and the driving of the modules at this midposition, rather than driving the modules at the position of the pivot axes as is conventionally done, provides substantially constant speed drive of the conveyor belt, substantially eliminates sprocket-to-belt wear, and provides a belt capable of faster running speeds than conventional belts by reason of the minimized chordal action and scrubbing.

The angled surfaces 32 and 34 of the intermediate section also serve to present greater surface area to water and/or steam jets which can be located above and below the modules for cleaning of the belt. The angled sections also facilitate visual inspection of the belt.

The modules are interconnected as illustrated in FIG. 6 by insertion of a pivot rod 26 between the aligned openings 24 of each pair of modules, and by insertion of retaining pins 44 into slots 40 and 42 of end sections 16 and 18 to secure the pivot rod within the linked modules. The pivot rod 26 is of a length to extend between the confronting inner surfaces of the retaining pins 44 to provide support of all linked ends. The retaining pins 44 are easily inserted by pushing each pin downwardly through a respective slot 40 and into seated engagement, with the upper portion 58 of the pin disposed within upper slot 40, the lower leg portions 60 disposed within slot 42, and the rounded midsection 62 secured within circular opening 24 of the associated end section. The retaining pin is sufficiently resilient for the legs to squeeze together as the pin is inserted, and once in seated position, to spring open to retain the pin within the end section. Removal of the pin is accomplished by pushing on the legs of the pin in lower slot 42, such as by a small screwdriver, to urge the pin out of the slots. Typically, the retaining pins can be fabricated in strip form by thin webs which join the top portion 58 and the legs of an adjacent pin. In use, individual pins are broken or cut from the interconnecting web as the pin is needed for insertion into the module end.

The modules are end-to-end reversible such that either linking end of the module can be joined to either linking end of an adjacent module. The edges of an assembled conveyor belt formed of these modules are in line as provided by the side rails 46 and 48, and the entire belt can be closely adjacent to a conveyor trough or side walls within which a product is conveyed on the conveyor surface 64 of the belt. The belt length can be changed in increments of one pitch by reason of the symmetry of the modules. The sprocket recesses 50 are in line and can be driven in either direction. The associated sprocket teeth are also symmetrical and in line such that the sprocket wheel can be driven in either direction and installed either way on a driving shaft.

Figure 12:
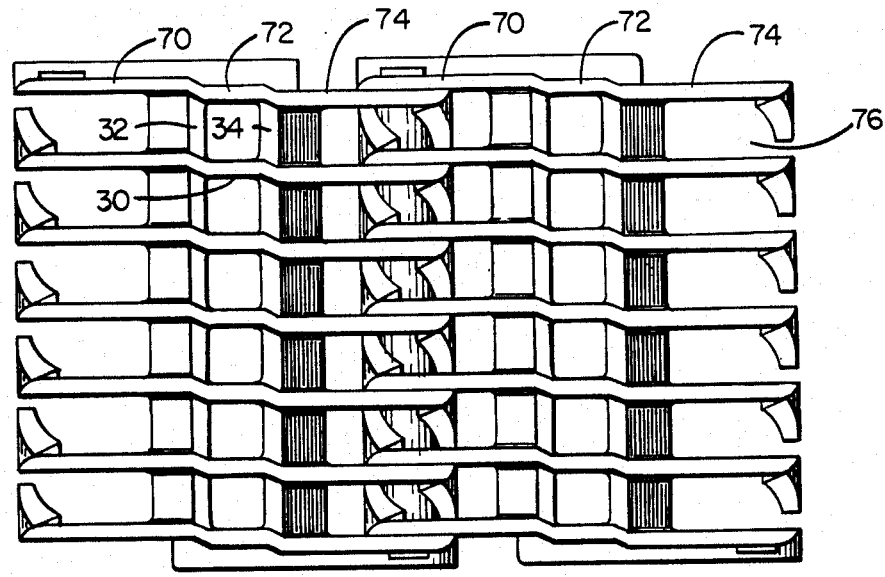
FIG. 12 is a top view of a pair of interconnected modules of FIG. 8.
Figure 14:
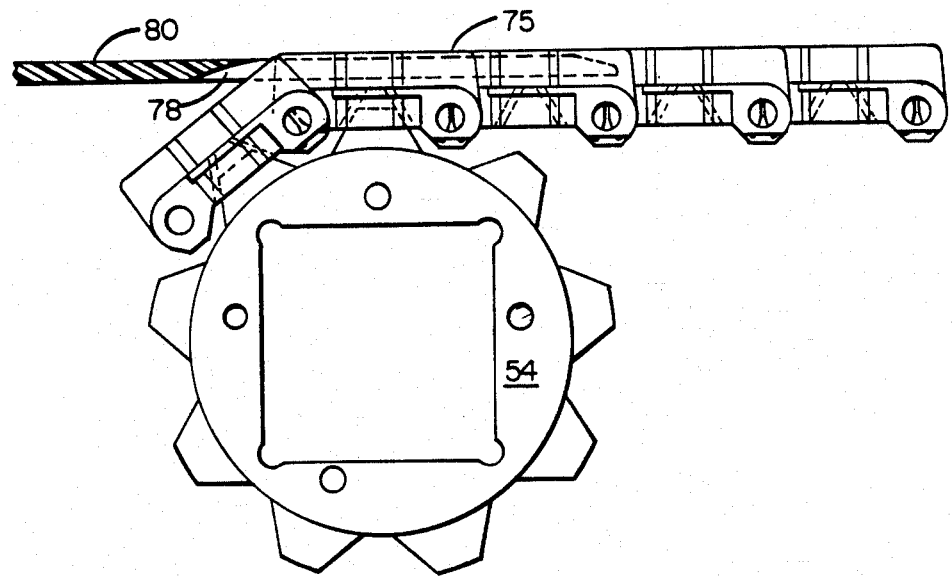
FIG. 14 is an elevation view of a conveyor belt composed of the modules of FIG. 8 and cooperative with a sprocket wheel.

An alternative embodiment is shown in FIGS. 8–11 in which the link sections are upwardly extending to provide an upper conveyor surface with axial passageways into which the teeth of a conveyor comb can extend while the belt is in motion. The sections 20a and 28a upwardly extend as raised flights or ribs which extend above the sections 30, 32, and 34 of the box beam intermediate section of the module. These raised ribs, identified by reference numerals 70, 72, and 74, are parallel to and laterally offset from each other, as are the link sections of the embodiment described above. The interconnected modules, as shown in FIG. 12, provide a substantially flat conveying surface 75, and the raised ribs define longitudinal channels 76 which are adapted to receive the teeth 78 of a conveyor comb 80 for transfer of products to and from the conveyor belt. As seen in FIG. 14, the conveyor comb 80 is disposed as a continuation of the conveying surface at a position at which the conveyor belt moves in a curved path around an associated sprocket wheel 54. The teeth 78 of the conveyor comb are disposed within respective channels 76 between the raised ribs, and preferably have inclined upper surfaces which taper downwardly from the comb surface to the teeth ends which lie below the conveying surface of the raised ribs. Typically, the comb is mounted for rotation about a pivot pin at the end opposite to the comb teeth and is spring loaded to urge the teeth into engagement with the upper surfaces of the intermediate section of the belt modules. The operation of this embodiment in conjunction with a conveyor comb is similar to the operation of the conveyor belt of U.S. Pat. Nos. 4,051,949 and 4,171,045, both assigned to the Assignee of this invention.

Figure 13:
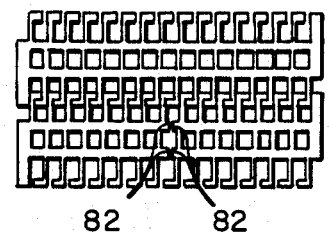
FIG. 13 is a top view illustrating the lateral interconnection of modules to form a conveyor belt of intended width.

In the embodiment of FIGS. 8-11, the modules are constructed for side-to-side assembly into a belt of intended overall width. One side of each module includes projections 82 which are extensions of the transverse sections 32 and 34 and which extend to a plane which is substantially midway between the gap of adjacent link ends. These projections engage like projections of a laterally adjacent module in an assembled belt to provide spacing and support of the laterally connected modules. Preferably, the modules are integral multiples of one another in width such that modules can be assembled in brick-laid fashion as shown in FIG. 13, with a module extending across the gap between two or more linked modules. The module can include a side rail if this module is to be at the lateral end of an assembled conveyor belt or, if the module is to be assembled at an intermediate position within a belt, can include projections 82 on each side. It will be appreciated that the embodiment of FIGS. 1-4 can also include projections 82 on one or both sides, rather than one or both side rails, for side-to-side assembly into belts of intended width.

The modules described above are preferably fabricated as an integral unitary structure by injection molding of a plastic material such as polyethylene. The particular plastic material is determined in accordance with the characteristics desired to suit a particular operating environment. The pivot rods and retaining pins are typically of the same as compatible plastic material. It is contemplated that changes and modifications may be made in the invention without departing from the spirit and true scope thereof. Accordingly, the invention is not to be limited by what has been particularly shown and described except as indicated in the appended claims.

What is claimed is:

1. A conveyor belt comprised of a plurality of linked modules each of substantially identical pitch dimensions, and each of integral plastic molded construction, each module comprising:

a plurality of elongated parallel spaced link elements, the length of the module being equal to the length of the link elements, and the width of the module being determined by the number of link elements;

the link elements terminating in first and second pluralities of link ends, each link end being formed to circumscribe a pivot hole;

the pivot holes at each end being aligned on respective pivot axes lying in a first plane;

a grid structure integral with the link elements and disposed between the link ends and having longitudinal members integral with the link elements and extending along the length of the module and having two cross members integral with the link elements and extending across the width of the module which separate and join longitudinal members and the link elements;

the cross members being spaced along the length of the module and angularly disposed to provide sprocket recesses intermediate the pivot axes of the module and adapted to mate with corresponding sprocket teeth of a sprocket wheel;

the link elements and grid structure being of relatively thin and uniform wall thickness;

the thickness of the link elements being less than the spacing between adjacent link elements such that a pivot rod disposed in the pivot holes is substantially exposed between the link elements for visual inspection and cleaning;

substantially all of said link ends each including a projection extending transversely of the module toward a confronting link end and terminating short of the confronting link end by an amount to accommodate the link end of a mated module, each of the projections having sufficient bearing surface to distribute the tensile forces of conveyor movement while providing substantial exposure of the pivot rod;

the projections on a module being oppositely extending from the projections of linked modules to maintain linked modules in laterally fixed spaced position with portions of the pivot rod exposed for visual inspection and cleaning.

2. The conveyor belt of claim 1 wherein the inner surface of each of said projections are cylindrically contoured to mate with the cylindrical surface of a pivot rod.

3. The conveyor belt of claim 1 wherein said projections are of generally triangular shape to provide exposure of significant portions of the pivot rod for ease of visual inspection and cleaning.

4. The conveyor belt of claim 1 wherein said projections have skewed edges to serve as wipers to push debris which may collect on the pivot rod away from the bearing area.

5. The conveyor belt of claim 1 wherein the sides of said module include side rails which are in alignment with the corresponding side rails of mated modules.

6. The conveyor belt of claim 1 wherein the link elements include spaced apart elongated upstanding ribs extending in a substantially parallel direction to one another, the upper surface of said ribs defining a conveying surface;

the raised ribs defining longitudinal channels adapted to receive the teeth of a conveyor comb for transfer of products to and from the conveyor belt.

7. The conveyor belt of claim 1 wherein said module includes projections transversely extending from at least one side of the module and operative to engage like projections of a laterally adjacent module in an assembled belt to provide spacing and support of laterally connected modules.

8. The conveyor belt of claim 1 wherein said grid structure includes longitudinal members which are parallel to the link elements and offset therefrom along the width of the module to provide module sides colinear with the sides of linked modules.

9. The conveyor belt of claim 1 wherein the upper edges of the link elements and the grid structure are in a second plane above said first plane.

10. The conveyor belt of claim 1 wherein the diagonally opposite outer link ends of each module are thicker than the other link ends and each include a slot therein;

a retaining pin adapted to be retained in each of said slots and operative to secure the pivot rod within the aligned pivot holes of linked modules.

11. The conveyor belt of claim 1 wherein the diagonally opposite outer link ends of each module include side rails which are colinear with the side rails of linked modules and which serve as rub rails to minimize damage to the sides of the modules.

12. A conveyor belt comprised of a plurality of linked modules each of substantially identical pitch dimensions, and each of integral plastic molded construction, each module comprising:
- a first plurality of elongated parallel spaced link elements terminating in a first plurality of link ends;
- a second plurality of elongated parallel spaced link elements terminating in a second plurality of link ends;
- said link elements having upper edges defining a conveying surface;
- each link end being formed to circumscribe a pivot hole;
- the pivot holes at each end being aligned on respective pivot axes lying in a first plane;
- a grid structure integral with the first and second pluralities of link elements and disposed between the first and second pluralities of link ends, said grid structure having longitudinal members integral with the link elements and which are parallel to the link elements and offset therefrom along the width of the module, and having two cross members integral with the link elements and extending across the width of the module which separate and join the longitudinal members and the link elements;
- the grid structure having a first plurality of cross members extending across the width of the module which separate and join one end of the longitudinal members and the first plurality of link elements and a second plurality of cross members extending across the width of the module which separate and join the other end of the longitudinal members and the second plurality of link elements;
- the link elements and grid structure being of relatively thin and uniform wall thickness;
- the first and second pluralities of link elements lying across parallel spaced axes and offset from each other along the width of the module;
- the first plurality of cross members being angularly inclined from the conveying surface toward the first plurality of link ends, the second plurality of cross members being angularly inclined from the conveying surface toward the second plurality of link ends to provide sprocket recesses intermediate the pivot axes of the module and adapted to mate with corresponding sprocket teeth of a sprocket wheel;
- the sprocket recesses of linked modules beig colinear by reason of the offset link elements;
- the thickness of the link elements being less than the spacing between adjacent link elements of each plurality of link elements such that a pivot rod disposed in the pivot holes is substantially exposed between the link elements for visual inspection and cleaning;
- substantially all of said link ends each including a projection extending transversely of the module toward a confronting link end and terminating short of the confronting link end by an amount to accommodate the link end of a mated module, each of the projections having sufficient bearing surface to distribute the tensile forces of conveyor movement while providing substantial exposure of the pivot rod;
- the projections on a module being oppositely extending from the projections of linked modules to maintain linked modules in laterally fixed spaced position with portions of the pivot rod exposed for visual inspection and cleaning.

* * * * *